United States Patent
Takeda

(10) Patent No.: US 6,919,151 B2
(45) Date of Patent: Jul. 19, 2005

(54) REFLECTIVE COLOR FILTER

(75) Inventor: Akihiko Takeda, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/353,036

(22) Filed: Jan. 29, 2003

(65) Prior Publication Data

US 2003/0164928 A1 Sep. 4, 2003

(30) Foreign Application Priority Data

Jan. 29, 2002 (JP) ........................................ 2002-019451

(51) Int. Cl.$^7$ ................................................ G02B 5/20
(52) U.S. Cl. .......................................... 430/7; 359/885
(58) Field of Search ............................ 430/7; 349/106, 349/113, 114; 359/885, 891

(56) References Cited

U.S. PATENT DOCUMENTS 6,140,019 A  * 10/2000 Sakurai et al. ........... 430/288.1
6,278,507 B1 *  8/2001 Nakamura .................. 349/106
2003/0071942 A1 *  4/2003 Kojima et al. .............. 349/106

FOREIGN PATENT DOCUMENTS

| JP | 60-258539 | | 12/1985 |
| JP | 1-152449 | | 6/1989 |
| JP | 2-48664 | | 2/1990 |
| JP | 2-153353 | | 6/1990 |
| JP | 4-208940 | | 7/1992 |
| JP | 5-72724 | | 3/1993 |
| JP | 5-80503 | | 4/1993 |
| JP | 5-173320 | | 7/1993 |
| JP | 11-248931 A | * | 9/1999 |
| JP | 2000-239554 | | 9/2000 |

* cited by examiner

*Primary Examiner*—John A. McPherson
(74) *Attorney, Agent, or Firm*—Sughrue Mion, PLLC

(57) ABSTRACT

A reflective color filter having two or more kinds of patterned colored pixels differing from each other in hue on a substrate, in which at least one of the colored pixels is red pixels containing a quinacridone series red pigment, and wherein the value x of an xy specification system is 0.37 or more when the red pixels are measured by a D65 light source.

17 Claims, No Drawings

REFLECTIVE COLOR FILTER

BACKGROUND OF THE INVENTION

1. Field of the Invention

The present invention relates to a color filter and, more specifically, to a reflective color filter having red pixels containing a quinacridone series red pigment, wherein such a reflective color filter possesses both high color purity and high transmittance.

2. Description of the Related Art

Low power consumption is a necessary trait for displays mounted on portable terminals such as portable telephones and game machines. Hence, a reflective liquid crystal device (LCD) not requiring backlight is best suited for the displays on portable terminals. Low power consumption may be attained by lowering the concentration of the pigments contained in the colored pixels of a reflective color filter, but this causes a problem in that the color purity decreases with the reduction of the pigment concentration. On the other hand, when the concentration of the pigment is increased, color purity improves but transmittance is lowered.

Further, as the coloring ingredient of the red pixels among the colored pixels (usually, red pixels, green pixels and blue pixels) of conventional color filters, the red pigment comprises one of C.I. Pigment red 177 and C.I. Pigment red 254 used individually or in admixture with each other and/or with a yellow pigment at an appropriate ratio, in order to control color. Nonetheless, there is a need for a reflective color filter possessing both high color purity and high transmittance.

SUMMARY OF THE INVENTION

The present invention intends to solve the foregoing problems in the prior art and attain the following purposes:

The invention intends to provide a reflective color filter at a high contrast, having a clear tone, and high color purity and high transmittance compatible with each other, while attaining lower power consumption.

The foregoing object of the invention can be attained by the following constitutions.

A first embodiment of the present invention is a reflective color filter comprising, on a substrate, two or more kinds of patterned colored pixels differing from each other in hue, wherein at least one of the colored pixels is red pixels having a quinacridone series red pigment, and wherein a value x of an xy specification system is 0.37 or more when the red pixels are measured by a D65 light source.

A second embodiment of the present invention is a reflective color filter, according to the first embodiment, wherein the quinacridone type series red pigment is at least one member selected from the group consisting of C.I. pigment red 209, C.I. pigment red 207, C.I. pigment red 202, C.I. pigment red 192 and C.I. pigment red 122.

A third embodiment of the present invention is a reflective color filter, according to the first embodiment, wherein the value x is from 0.37 to 0.40.

A fourth embodiment of the present invention is a reflective color filter, according to the first embodiment, wherein the value Y in the CIE1931 colorimetric system of the red pixels is 56 or more.

A fifth embodiment of the present invention is a reflective color filter, according to the first embodiment, wherein the red pixels contain a dispersed pigment composition containing a quinacridone series red pigment and a resin.

A sixth embodiment of the present invention is a reflective color filter, according to the fifth embodiment, wherein the red pixels comprise a colored light sensitive composition, which contains the dispersed pigment composition, a polyfunctional monomer having two or more ethylenically unsaturated double bonds, and a photopolymerization initiator.

A seventh embodiment of the present invention is a reflective color filter, according to the fifth embodiment, wherein the content of the quinacridone series red pigment is 5 to 20 mass % of the dispersed pigment composition.

An eighth embodiment of the present invention is a reflective color filter, according to the fifth embodiment, wherein the resin is a polymer having acidic groups.

A ninth embodiment of the present invention is a reflective color filter, according to the eighth embodiment, wherein the acid value of the polymer having the acidic groups is 60 to 130.

A tenth embodiment of the present invention is a reflective color filter, according to the eighth embodiment, wherein the polymer having the acid groups contains at least one member selected from the group consisting of a copolymer of acrylic acid and acrylate ester, a copolymer of methacrylic acid and methacrylate ester, a styrene/maleic acid anhydride copolymer, and a reaction product of styrene/maleic acid anhydride copolymer and alcohol.

An eleventh embodiment of the present invention is a reflective color filter, according to the eighth embodiment, wherein the average molecular weight of the polymer having acidic groups is from 5,000 to 200,000.

A twelfth embodiment of the present invention is a reflective color filter, according to the fifth embodiment, wherein the dispersed pigment composition contains a dispersant and the dispersant has an azo pigment skeleton.

A thirteenth embodiment of the present invention is a reflective color filter, according to the twelfth embodiment, wherein the dispersant is a compound represented by the following general formula (I):

$$A\text{-}N=N\text{—}X\text{—}Y \qquad \text{General Formula (I)}$$

where A represents a group capable of forming an azo pigment, X represents a single bond or a group selected from the bivalent bonding groups represented by the following structural formula, Y represents a group represented by the following general formula (II)

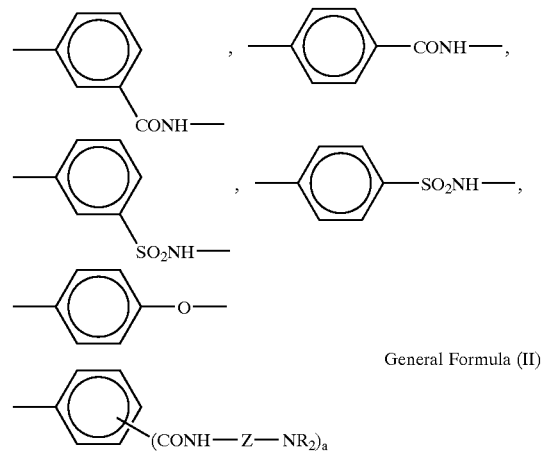

General Formula (II)

where Z represents a lower alkylene group, —NR$_2$ represents a 5-membered or 6-membered saturated hetero ring containing a lower alkyl amino group or a nitrogen atom and a represents 1 or 2.

A fourteenth embodiment of the present invention is a reflective color filter, according to the sixth embodiment, wherein the polyfunctional monomer having two or more ethylenically unsaturated double bonds contains at least one member selected from the group consisting of acrylate ester, urethane acrylate, acrylic acid amide, methacrylate ester, urethane methacrylate, methacrylic acid amide, allyl compound and vinyl ester.

A fifteenth embodiment of the present invention is a reflective color filter, according to the sixth embodiment, wherein the content of the polyfunctional monomer having two or more ethylenically unsaturated double bonds is 10 to 60 mass % of the total solid content of the colored light sensitive composition.

A sixteenth embodiment of the present invention is a reflective color filter, according to the sixth embodiment, wherein the photopolymerization initiator contains at least one compound having a molecular absorption coefficient of at least 50 in a wavelength from 300 to 500 nm.

A seventeenth embodiment of the present invention is a reflective color filter, according to the sixth embodiment, wherein the photopolymerization initiator contains at least one member selected from the group consisting of aromatic ketones, lophine dimers, benzoins, benzoin ethers and polyhalogens.

An eighteenth embodiment of the present invention is a reflective color filter, according to the sixth embodiment, wherein the content of the photopolymerization initiator is 0.2 to 10 mass % of the total solid content of the colored light sensitive composition.

A nineteenth embodiment of the present invention is a reflective color filter, according to the first embodiment, the reflective color filter being disposed on a substrate by (1) a step of forming a layer comprising a colored light sensitive composition on a substrate either by a step of coating and drying the colored light sensitive composition on the substrate or a step of transferring a layer formed by coating and drying the colored light sensitive composition on a temporal support, and (2) a step of exposing and developing the layer comprising the colored light sensitive composition thereby forming a pattern.

A twentieth embodiment of the present invention is a reflective color filter, according to the nineteenth embodiment, wherein the thickness of the layer comprising the colored light sensitive composition is 0.7 $\mu$m to 3.0 $\mu$m.

DESCRIPTION OF THE PREFERRED EMBODIMENTS

The reflective color filter according to the present invention will be described in detail.

The reflective color filter according to the invention has two or more kinds of patterned colored pixels differing from each other in hue on a substrate in which at least one of the colored pixels is red pixels containing a quinacridone type red pigment as a red pigment, and where the value x of an xy specification system is 0.37 or more when the red pixels are measured by a D65 light source.

Further, the red pixels preferably comprise a colored light sensitive composition containing a dispersed pigment composition containing a red pigment such as C.I. pigment red 209, C.I. pigment red 207, C.I. pigment red 202, C.I. pigment red 192 and C.I. pigment red 122, as well as a resin, a polyfunctional monomer having two or more ethylenically unsaturated double bonds, and a photopolymerization initiator.

Dispersed Pigment Composition

A dispersed pigment composition contained in a colored light sensitive composition constituting a reflective color filter according to the present invention will be described.

In the invention, the dispersed pigment composition contains a quinacridone type red pigment and a resin.

Pigment Contained in Red Pixels

A quinacridone type red pigment, such as C.I. pigment red 209, C.I. pigment red 207, C.I. pigment red 202, C.I. pigment red 192 or C.I. pigment red 122, is used as the preferred ingredient in the red pixels of the reflective color filter according to the present invention. These pigments may be used either individually or in combination.

Red pixels possessing both high color purity and high transmittance can be obtained by using a dispersed pigment composition containing the quinacridone type pigment and the resin.

In the invention, the red pigment and/or yellow pigment other than the quinacridone type red pigment described above can be used in combination. However, the content of the quinacridone to the red pigment (other than the quinacridone type red pigment) or the yellow pigment to be used in combination with the red pigment is preferably 99.9 to 10 mass % and, more preferably, 99.5 to 50 mass %. When the ratio of the red pigment (other than the quinacridone type red pigment) or the yellow pigment increases, there are cases where the light transmittance of the color filter lowers.

Red pigments (other than the quinacridone type red pigment) usable in combination with no restrictions can include, for example, C.I. pigment red 9, C.I. pigment red 97, C.I. pigment red 123, C.I. pigment red 149, C.I. pigment red 168, C.I. pigment red 177, C.I. pigment red 180, C.I. pigment red 215, C.I. pigment red 216, C.I. pigment red 217, C.I. pigment red 220, C.I. pigment red 223, C.I. pigment red 224, C.I. pigment red 226, C.I. pigment red 227, C.I. pigment red 228, C.I. pigment red 240, C.I. pigment red 242, C.I. pigment red 48:1, C.I. pigment red 209, C.I. pigment red 146, C.I. pigment red 11, C.I. pigment red 81, C.I. pigment red 213, C.I. pigment red 272, C.I. pigment red 270, C.I. pigment red 255, C.I. pigment red 264, and C.I. pigment red 254.

In the dispersed pigment composition according to the invention, a violet pigment, which may also be used in combination, can include pigments such as C.I. pigment violet 19, C.I. pigment violet 23, C.I. pigment violet 29, C.I. pigment violet 30, C.I. pigment violet 37, C.I. pigment violet 40 and C.I. pigment violet 50.

The yellow pigment that can be used in combination with the quinacridone type red pigment according to the invention can include, for example, C.I. pigment yellow 2, C.I. pigment yellow 10, C.I. pigment yellow 12, C.I. pigment yellow 17, C.I. pigment yellow 20, C.I. pigment yellow 24, C.I. pigment yellow 55, C.I. pigment yellow 60, C.I. pigment yellow 65, C.I. pigment yellow 75, C.I. pigment yellow 83, C.I. pigment yellow 86, C.I. pigment yellow 87, C.I. pigment yellow 90, C.I. pigment yellow 93, C.I. pigment yellow 95, C.I. pigment yellow 99, C.I. pigment yellow 104, C.I. pigment yellow 109, C.I. pigment yellow 110, C.I. pigment yellow 114, C.I. pigment yellow 116, C.I. pigment yellow 117, C.I. pigment yellow 123, C.I. pigment yellow 125, C.I. pigment yellow 127, C.I. pigment yellow 137, C.I. pigment yellow 138, C.I. pigment yellow 139, C.I. pigment yellow 147, C.I. pigment yellow 148, C.I. pigment yellow 150, C.I. pigment yellow 152, C.I. pigment yellow 153, C.I. pigment yellow 154, C.I. pigment yellow 156, C.I. pigment yellow 162, C.I. pigment yellow 165, C.I. pigment yellow 166, C.I. pigment yellow 168, C.I. pigment yellow 169, C.I. pigment yellow 181, C.I. pigment yellow 182, C.I. pigment yellow 183, C.I. pigment yellow 185, C.I. pigment yellow 191, and C.I. pigment yellow 193. These pigments can be used with no restriction to them.

Further, in the dispersed pigment composition according to the invention, an orange pigment can be used in combination and the orange pigment can include, for example, C.I. pigment orange 36, C.I. pigment orange 43, C.I. pigment orange 51, C.I. pigment orange 55, C.I. pigment orange 59, C.I. pigment orange 61, and C.I. pigment orange 71.

The content of the quinacridone type red pigment is preferably 5 to 20 mass % and, more preferably, 8 to 18 mass %.

Resin

The resin contained in the pigment dispersion is preferably a polymer having acidic groups. For the resin, use of the polymer having the acidic group is preferred since it can provide steric repulsion to improve the dispersion stability of the pigment and improve the alkali developability when used as the colored light sensitive composition. The polymer having the acidic groups can include, for example, a copolymer of (meth)acrylic acid and (meth)acrylate ester, styrene/maleic acid anhydride copolymer and reaction products of styrene/maleic acid anhydride copolymer and alcohols. They may be used alone or two or more of them may be used in combination. Among them, it is preferable to use those that excel in pigment dispersibility, and also excel in their compatibility with the polyfunctional monomer and the photopolymerization initiator when used as the colored light sensitive composition; and those having appropriate alkali developer solubility, organic solvent solubility, strength and softening temperature are preferred and, specifically, a copolymer of (meth)acrylic acid and (meth)acrylate ester (for example, methacrylic acid/benzyl methacrylate copolymer) is preferred.

The acid value of the polymer having the acidic groups is preferably 60 to 130 and, more preferably, 90 to 120, because the dispersion stability is good and the viscosity can be suppressed. Further, the unit for the acid value is represented by mg of potassium hydroxide required for neutralizing 1 g of the polymer. Further, the acid value of the polymer can be controlled by the molar ratio of the monomers constituting the polymer.

The weight average molecular weight of the polymer having the acidic groups is preferably 5,000 to 200,000. When the weight average molecular weight is less than 5,000, it sometimes results in a problem in view of the formation of the coating film when used as the colored light sensitive composition and, on the contrary, when it exceeds 200,000, viscosity of the colored light sensitive composition is sometimes increased.

The content of the resin in the dispersed pigment composition fluctuates in view of a preferred range thereof depending on the kind of the composition used and, generally, it is preferably from 10 to 200 mass parts and, more preferably, 20 to 150 mass parts based on 100 mass parts of the pigment. When the content is within the range described above, it is preferred since the steric repulsive effect can be obtained and excess increase of the viscosity of the liquid dispersion can be prevented.

Dispersant

The dispersed pigment composition in the present invention more preferably contains a dispersant. The dispersant used in the invention is preferably a compound having a pigment skeleton, and a compound having an azo pigment skeleton is more preferred. Particularly, the compound represented by the following general formula (I) is preferred.

When the dispersant described above is used, the dispersant adsorbs on the surface of the pigment particles by nitrogen atoms of the dispersant to attain a state in which the surface of the pigment particles is covered with the dispersant to suppress adsorption of the pigment particles to each other, and the pigments are less coagulated to each other. As a result, the pigment particles are dispersed as they are in a finely particulated state to particularly improve the dispersibility of the pigment.

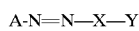　　　　　　　　General Formula (I)

In the general formula (I) above, A represents a group capable of forming an azo pigment. A can be selected optionally so long as it is a group capable of coupling with a diazonium compound to form an azo pigment.

Concrete examples for A are to be shown below but the invention is no way restricted to such concrete examples.

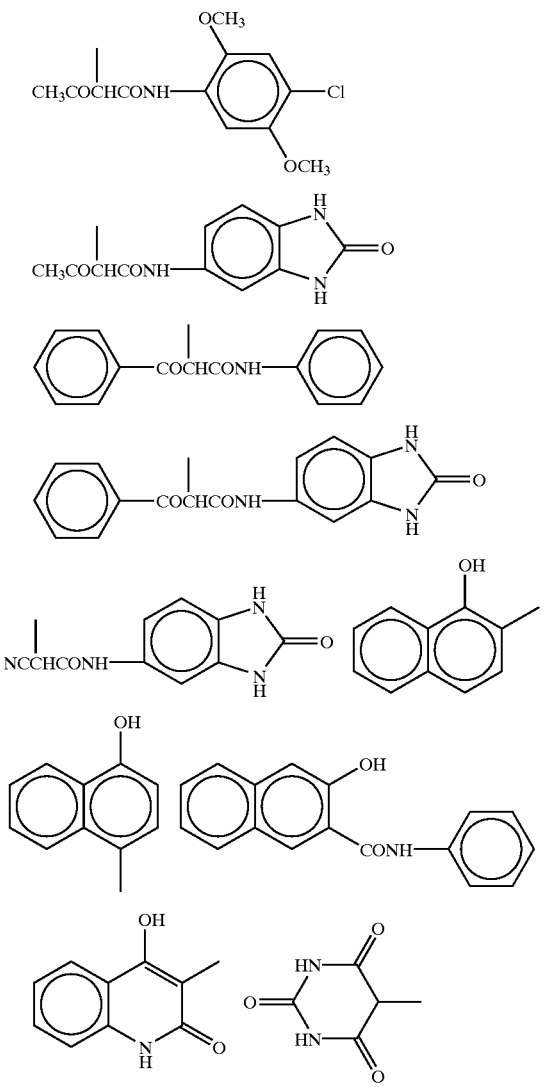

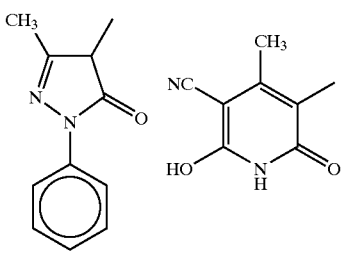

In the general formula (I) above, X represents a single bond (which means that Y is direct bonded with —N=N—), or a group selected from the bivalent bonding group represented by the following structural formula.

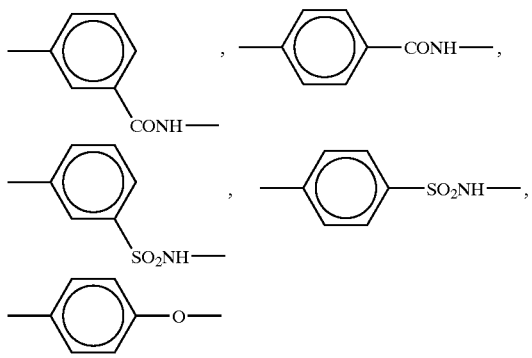

In the general formula (I) above, Y represents a group represented by the following general formula (II).

General Formula (II)

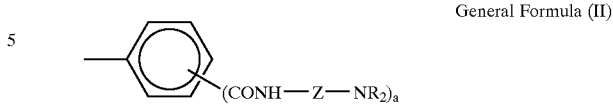

In the general formula (II), Z represents a lower alkylene group. Z represents —$(CH_2)_b$— in which b represents an integer of 1–5, preferably, 2 or 3.

In the general formula (II) above, —$NR_2$ represents a lower alkylamino group or a 5-membered or 6-membered saturated hetero ring containing nitrogen atom. When —$NR_2$ represents the lower alkylamino group, it is represented as —$N(C_nH_{2n+1})_2$ in which n represents an integer of 1–4, preferably, 1 or 2. On the other hand, when —$NR_2$ represents a 5-membered or 6-membered saturated hetero ring, the hetero ring represented by the following structural formula is preferred.

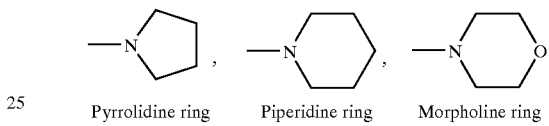

Pyrrolidine ring   Piperidine ring   Morpholine ring

Z and —$NR_2$ in the general formula (II) may have, respectively, lower alkyl group and alkoxy group as substituents.

In the general formula (II), a represents 1 or 2, preferably, represents 2.

Examples of the compounds (1–22) represented by the general formula (I) are shown below but the invention is no way restricted to such examples.

1.
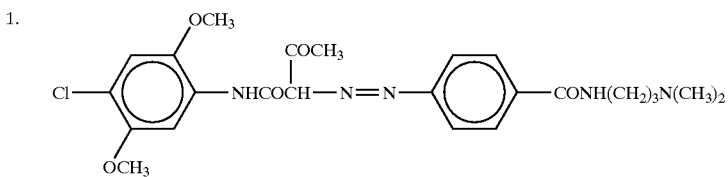

2.
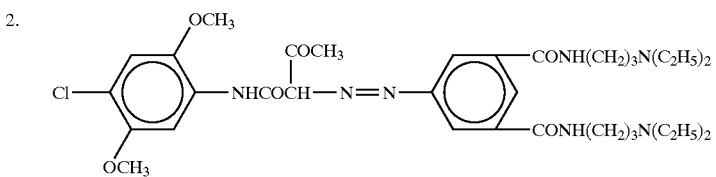

3.
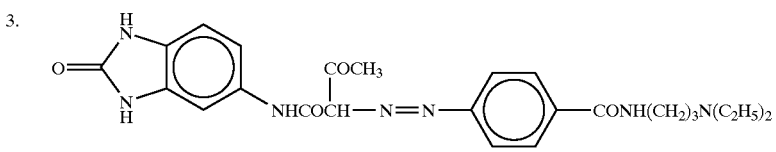

4.
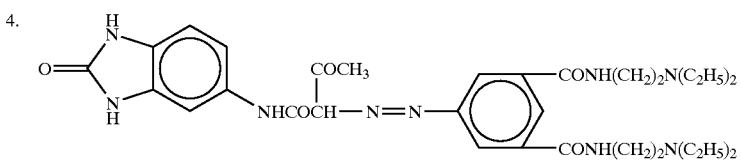

-continued
5. 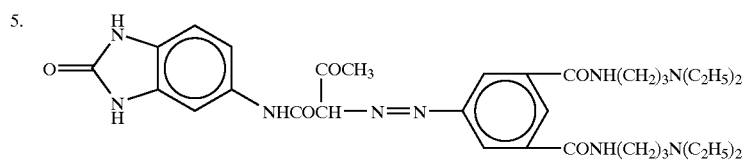
6. 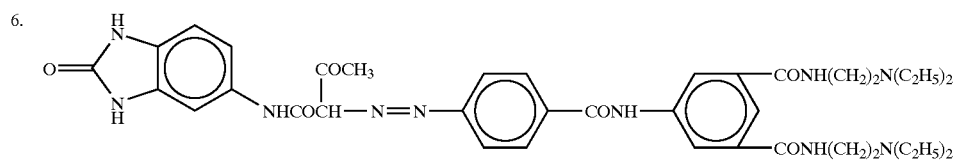
7. 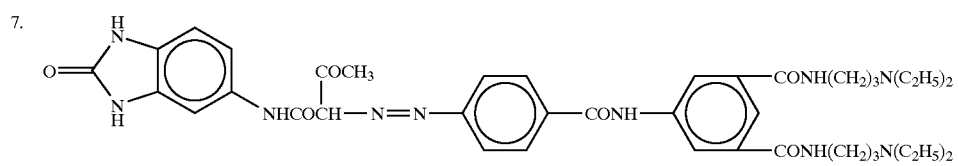
8. 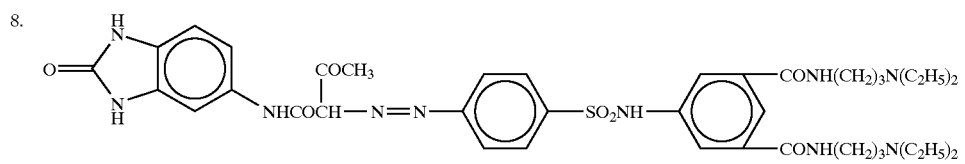
9. 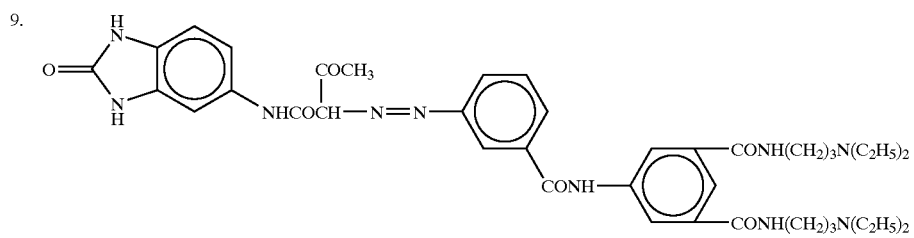
10. 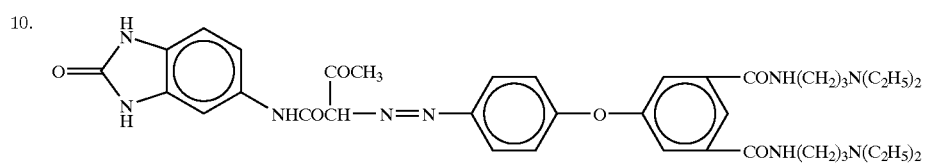
11. 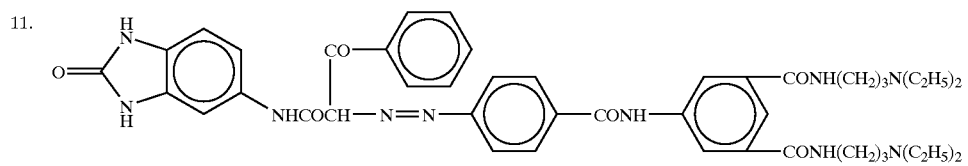
12. 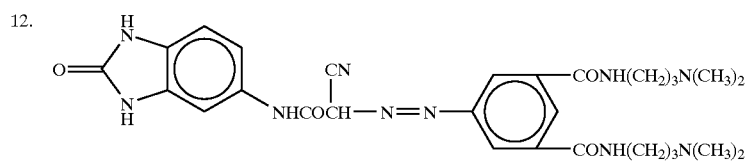
13. 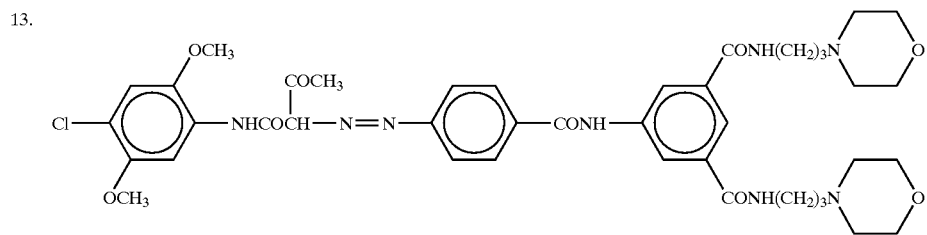

14. 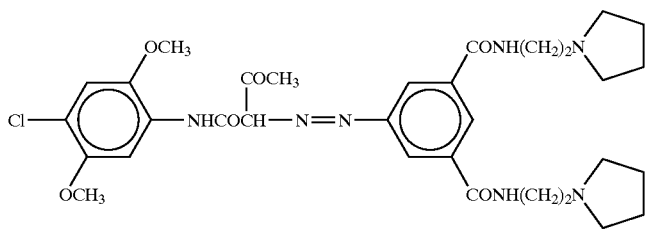
15. 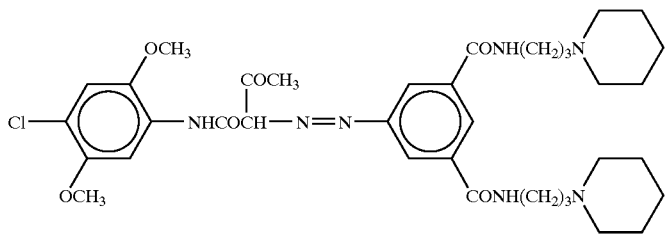
16. 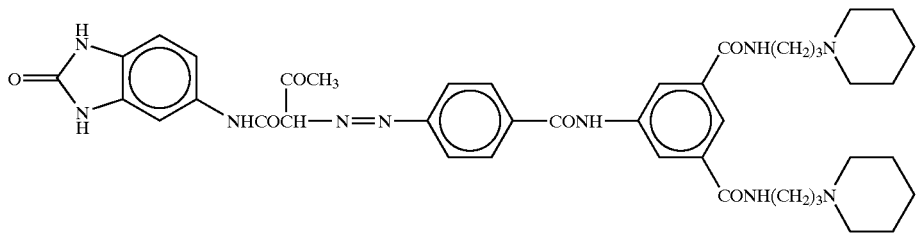
17. 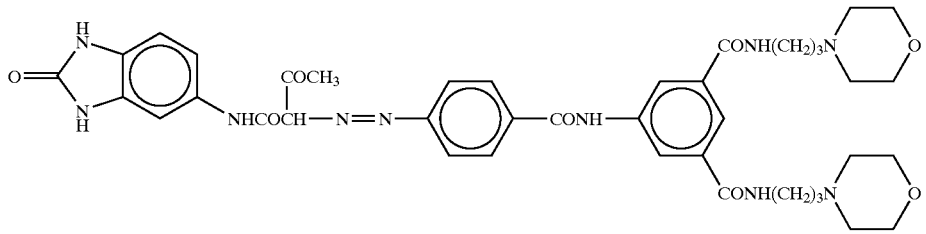
18. 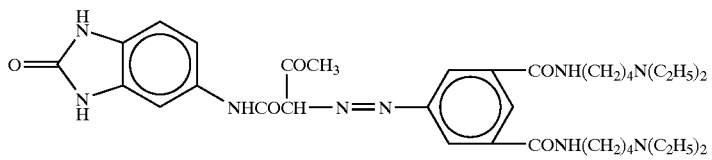
19. 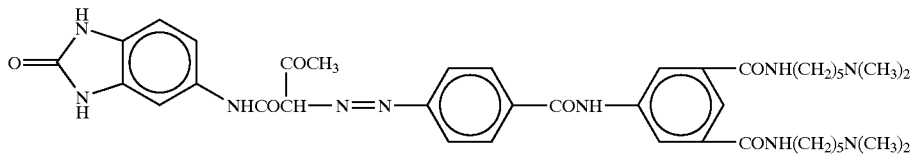
20. 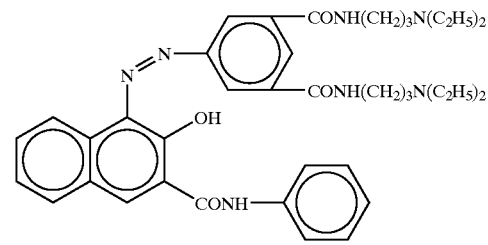
21. 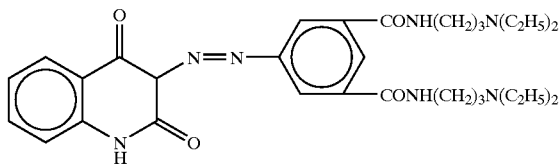

22. 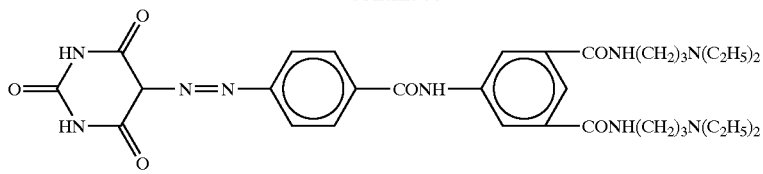

-continued

An amine compound represented by the general formula (III) and/or an amine compound represented by the general formula (IV) described in columns [0038] to [0043] of JP-A No. 2000-239554, are used preferably together with the compound represented by the general formula (I).

The compound represented by the general formula (I) can be synthesized in accordance with the method described in columns [0033]–[0035] of JP-A No. 2000-239554.

Further, as the compound represented by the general formula (I), commercial products may be used which can include, for example, "SOLSPERSE 22000" of Abina Co.

In the present invention, the content of the dispersant in the dispersed pigment composition varies its preferred range depending on the kind of the dispersant used and it is preferably 0.1 to 100 mass parts, more preferably, 1 to 30 pass marts based on 100 mass parts of the pigment. The content within the range described above is preferred since the chromaticity can be controlled easily while preventing viscosity of the dispersed pigment composition from increasing excessively in the manufacture of the reflective color filter and the like.

Other Ingredients

As the dispersed pigment composition according to the present invention, other ingredients such as surfactant may also be incorporated optionally. Incorporation of the surfactant is preferred since the dispersion stability of the pigment is improved more. The surfactant can include, for example, anionic surfactant such as alkyl naphthalene sulfonate and phosphoric acid ester salts, cationic surfactant typically represented by amine salts, or amphoteric surfactants typically represented by amino carboxylic acid and betain.

Pigment Contained in the Colored Pixel Other than the Red Pixel

The pigment usable for the colored pixels other than the red pixels can include the following organic pigments. For example, they can include yellow pigment, orange pigment, blue pigment, green pigment, brown pigment and black pigment.

In a case where the dispersant is a compound having an azo pigment skeleton (for example, a compound represented by the general formula (I)), it is preferred that the pigment to be used in combination is also a pigment having an azo pigment skeleton.

The yellow pigment can include suitably, for example, C.I. pigment yellow 2, C.I. pigment yellow 10, C.I. pigment yellow 12, C.I. pigment yellow 17, C.I. pigment yellow 20, C.I. pigment yellow 24, C.I. pigment yellow 55, C.I. pigment yellow 60, C.I. pigment yellow 65, C.I. pigment yellow 75, C.I. pigment yellow 83, C.I. pigment yellow 86, C.I. pigment yellow 87, C.I. pigment yellow 90, C.I. pigment yellow 93, C.I. pigment yellow 95, C.I. pigment yellow 99, C.I. pigment yellow 104, C.I. pigment yellow 109, C.I. pigment yellow 110, C.I. pigment yellow 114, C.I. pigment yellow 116, C.I. pigment yellow 117, C.I. pigment yellow 123, C.I. pigment yellow 125, C.I. pigment yellow 127, C.I. pigment yellow 137, C.I. pigment yellow 138, C.I. pigment yellow 139, C.I. pigment yellow 147, C.I. pigment yellow 148, C.I. pigment yellow 150, C.I. pigment yellow 152, C.I. pigment yellow 153, C.I. pigment yellow 154, C.I. pigment yellow 156, C.I. pigment yellow 162, C.I. pigment yellow 165, C.I. pigment yellow 166, C.I. pigment yellow 168, C.I. pigment yellow 169, C.I. pigment yellow 181, C.I. pigment yellow 182, C.I. pigment yellow 183, C.I. pigment yellow 185, C.I. pigment yellow 191, and C.I. pigment yellow 193.

The orange pigment can include, for example, C.I. pigment orange 36, C.I. pigment orange 43, C.I. pigment orange 51, C.I. pigment orange 55, C.I. pigment orange 59, C.I. pigment orange 61, and C.I. pigment orange 71.

The blue pigment can include, for example, C.I. pigment blue 15, C.I. pigment blue 15:6, C.I. pigment blue 22, C.I. pigment blue 60 and C.I. pigment blue 64.

The green pigment can include, for example, C.I. pigment green 7 and C.I. pigment green 36.

The brown pigment can include, for example, C.I. pigment brown 23, C.I. pigment brown 25, and C.I. pigment brown 26. The black pigment can include, for example, C.I. pigment black 7.

The pigments described above may be used alone or two or more kinds of them may be used in combination. In the reflective color filter according to the invention, pigment green 36 is preferred for the green pixel and pigment blue 15, etc. are particularly preferred for the blue pixels among them.

While the content of the pigment contained in the dispersed pigment composition in the invention varies its preferred range depending on the kind thereof to be used, it is generally, preferably, 5 to 80 mass % and, more preferably, 10 to 70 mass %. The content within the range described above is preferred since this can prevent viscosity from increasing excessively while maintaining high coloring power.

Preparation of Dispersed Pigment Composition

The dispersed pigment composition can be prepared by dispersing the pigment, the resin and the dispersant together with a solvent by a dispersing equipment such as a sand mill.

In this case, the pigment and the dispersant may be previously mixed and refined, and then the mixture may be dispersed in an organic solvent (or vehicle), the pigment and dispersant may be previously refined separately, then dispersed or dissolved in an organic solvent (or vehicle) and the obtained dispersion or solution may be mixed, or the refined pigment and the dispersant may be separately added to and dispersed in an organic solvent (or vehicle). Particularly, it is preferred that the pigment and the dispersant are refined simultaneously or individually.

In this case, the vehicle means a portion of the medium dispersing the pigment when the paint is in a liquid state and it can include, in addition to the organic solvent, also an ingredient which is liquid and coupled with the pigment to set the coating film (binder resin).

There is no particular restriction on the dispersing machine used upon dispersing the refined pigment and the dispersant into the organic solvent and can include those known dispersing equipments such as a kneader, roll mill, attritor, super mill, disolver, homomixer and sand mill.

In the dispersed pigment composition according to the invention, the organic solvent in which the dispersant, the pigment and the resin are dispersed has no particular restriction and can be selected properly from those known solvents, and they can preferably include, for example, (poly) alkylene glycol monoalkyl ethers such as ethylene glycol monomethyl ether, ethylene glycol monoethyl ether, propylene glycol monomethyl ether, propylene glycol monoethyl ether, diethylene glycol monomethyl ether, ethylene glycol monoethyl ether and acetate esters thereof; acetate esters such as ethyl acetate, n-propyl acetate, i-propyl acetate, n-butyl acetate and i-butyl acetate; aromatic hydrocarbons such as benzene, toluene and xylene; ketones such as methyl ethyl ketone, acetone, methyl isobutyl ketone and cyclyhexanone; alcohols such as ethanol, propanol, butanol, hexanol, cyclohexanol, ethylene glycol, diethylene glycol and glycerine. They may be used alone or two or more of them may be used in combination. Among them, alkylene glycol monoalkyl ethers and acetate esters thereof, acetate esters, methyl ethyl ketone, etc. are particularly preferred.

The content of the organic solvent in the dispersed pigment composition is usually 10 to 1000 mass parts and, preferably, 20 to 500 mass parts based on 100 mass parts of the pigment. The content within the range described above is preferred since this can prevent the viscosity of the dispersed pigment composition from increasing excessively and there is no difficulty for ensuring space during storage.

In the invention, the average grain size of the pigment and the dispersant is preferably 100 nm or less. The average grain size of the pigment and the dispersant can be made into the range described above by dispersing the pigment and the dispersant by a high speed sand mill or the like for a long time thereby dispersing the pigment and the dispersant and, at the same time, making the primary particles finer. However, since this requires a great amount of energy, and fine pigment particles and the dispersant obtained by such a method tend to cause weak coagulation generally referred to as flocculation, the dispersion tends to be highly viscous and thixotropic to result in a problem that uniform coating film can not be obtained easily for the reflective color filter. Accordingly, it is preferred that primary particles are made finer and then dispersed for both the pigment and the dispersant.

The refining treatment for the pigment and the dispersant may be conducted simultaneously or individually. Refining treatment conducted in a state where the pigment and the dispersant are present together is preferred since the production property is preferred. The refining treatment can include a method of mechanically pulverizing the pigment and the dispersant to reduce the grain size (referred to as grinding method), a method of dissolving them in a good solvent which is then charged in a poor solvent to precipitate the pigment and the dispersant of fine grain size (referred to as precipitation method) and a method of preparing particles of fine grain size upon synthesis (synthetic precipitation method). An appropriate method may be selected and conducted depending on the synthesis method or the chemical property of the pigment and the dispersant to be used. The refinement may be practiced by combining two or more of the methods. Further, when the refinement is conducted individually for the pigment and the dispersant, each of the refining treatment may be different.

Relatively uniform pigment particles and/or dispersion particles can be obtained by using a grinding method of grinding the pigment and/or the dispersant using a ball mill, sand mill or kneader together with a grinding agent such as table salt, then removing the grinding agent to refine the primary particles.

The precipitation method is a method of dissolving the pigment and/or the dispersant into an appropriate good solvent and then mixing them with a poor solvent to precipitate fine crystal particles in which the size of the primary particles can be controlled in accordance with the kind and the amount of the solvent, precipitation temperature, precipitation speed and the like. The solvent used can include, for example, a strongly acidic solvent such as concentrated sulfuric acid, polyphosphoric acid or chrolosulfonic acid or a basic solvent such as liquid ammonia, or a dimethyl formamide solution of sodium methylate.

The precipitation method include a leuco method as a special precipitation method. When a vat pigment pigment such as a flavanthrone system, perinone system, perylene system or indanthrone system is reduced with an alkaline hydrosulfite, quinone groups are formed into a sodium salt of hydroquinone (leuco compound) to make the system water soluble. When an appropriate oxidizing agent is added to the aqueous solution for oxidation, fine pigment and dispersant can be precipitated.

The synthetic precipitation method is a method of synthesizing the pigment and/or the dispersant and, simultaneously, precipitating them as fine crystal grains. However, in a case of taking out the resultant fine pigment and/or the fine dispersant from the solvent, since filtration as a usual separation method is difficult to be applied unless the particles are agglomerated into large secondary particles, this method is usually applied to a pigment such as an azo type that is synthesized in an aqueous system tending to easily cause secondary agglomeration.

While any of the methods described above may be used for the refining treatment, the grinding method is preferred among them since the material is less restricted relatively. The pulverizing method is to be described specifically. This is a method of mechanically kneading the pigment and the dispersant together with a water soluble inorganic salt such as sodium chloride and an water soluble organic solvent not dissolving the salt (the step is hereinafter referred to as salt milling), then removing the inorganic salt and the organic solvent, and water washing and drying them to obtain fine primary particles of the pigment and the dispersant. However, since the pigment and the dispersant may be sometimes grown crystallographically by the salt milling treatment, it is effective to use a method of adding a solid resin which is at least partially dissolved in the organic solvent or a pigment dispersant during treatment thereby preventing crystal growth.

Referring to the ratio for the pigment and the dispersant to the inorganic salt, the refining efficiency for the pigment and the dispersant is improved as the ratio of the inorganic salt increases, but the productivity is lowered since the treating amount of the pigment and the dispersant is decreased. Generally, the inorganic salt is used by 1 to 20 mass parts, preferably, 2 to 10 mass parts based on one mass part of the pigment and the dispersant. The wetting agent is added so as to make the dispersant and the inorganic salt into uniform lumps and it is usually used in an amount of 50 mass % to 300 mass % of the pigment while depending on the blending ratio of the pigment and the dispersant, and the inorganic salt.

Referring to the salt milling more specifically, a small amount of a water soluble organic solvent is added as a wetting agent to the mixture of the pigment and the dispersant with the water soluble inorganic salt, which are kneaded intensely by using a kneader or the like, the mixture is poured into water, and stirred by a high speed mixer or the like into a slurry. Then, the slurry is filtered, washed with water and then dried to obtain a pigment and/or a dispersant of refined primary particles.

The dispersed pigment composition according to the invention can be used, for example, as a paint and a printing ink. Further, image formation can be conducted, for example, by a method of coating and drying a coating liquid containing a dispersed pigment composition on a support to form a layer of a dispersed pigment composition, or transferring a layer of the dispersed pigment composition formed on a temporal support on a support, forming a layer of a known positive or negative type light sensitive resin composition thereon, exposing and developing the same and then removing the layer of the not exposed light sensitive resin composition together with the layer of the dispersed pigment composition in the identical region. Further, it can be served as a colored light sensitive composition for the image formation capable of forming images by photoirradiation by mixing the same with a light sensitive composition. This will be described later.

Coloring Light Sensitive Composition

The reflection color filter according to the present invention has a feature in including the colored light sensitive composition containing the dispersed pigment composition, the polyfunctional monomer having two or more ethylenically unsaturated double bonds, and the photopolymerization initiator.

Since the colored light sensitive composition in the invention contains the dispersed pigment composition, it is excellent in the tone and also excellent in the dispersion stability of the pigment. Particularly, when it is utilized for the preparation of the reflective color filter, it is possible to stably prepare a reflective color filter having a clear tone, high contrast, with reduced film thickness and having high color purity and high transmittance compatible with each other.

Polyfunctional Monomer

The polyfunctional monomer containing the two or more ethylenically unsaturated bonds can include, for example, known (meth)acrylic acid esters, urethane (meth)acrylate, (meth)acrylic acid amide, allyl compounds, vinyl esters as described in JP-A 60-258539. They may be used alone or two or more kinds of them may be used in combination. Among them, (meth)acrylic acid ester is preferred.

The content of the polyfunctional monomer having ethylenically unsaturated double bonds in the colored light sensitive composition is preferably 10 to 60 mass % based on the entire solid content. The content within the range described above is preferred since curing effect during exposure can be maintained satisfactorily, with no suppression for the development of other performance of the material.

Photopolymerization Initiator

As the photopolymerization initiator, it is preferred to use at least one kind of compounds having a molecular absorption coefficient of at least about 50 in a wavelength of about 300 to 500 nm. Such compound can include, for example, aromatic ketones, lophine dimers, benzoin, benzoin ethers, and poly-halogens as described in JP-A Nos. 2-48664, 1-152449, and 2-153353. They may be used alone or two or more kinds of them may be used in combination. Among them, a combination of 4,4'-bis(diethylamino)benzophenone and 2-(O-chlorphenyl)-4,5-diphenyl imidazole dimer, and 4-[p-N,N-di(ethoxycarbonylmethyl)-2,6-di(trichloromethyl)-s-triazine] are preferred.

The content of the photopolymerization initiator in the colored light sensitive composition is preferably 0.2 to 10 mass % based on the entire solid content of the colored light sensitive composition. The content within the range described above is preferred since this can prevent the exposure sensitivity from increasing excessively making it difficult to control, while maintaining high exposure sensitivity.

The colored light sensitive composition can be prepared by mixing the dispersed pigment composition, the polyfunctional monomer having two or more ethylenically unsaturated double bonds and the photopolymerization initiator. Upon preparation, a resin may be added further. As the resin, a polymer having acidic groups usable for the dispersed pigment composition is preferred and use of a resin identical with the resin used upon preparation of the dispersed pigment composition is more preferred.

The content of the resin (particularly, polymer having acidic groups) in the colored light sensitive composition according to the invention is preferably about 20 to 80 mass % based on the entire solid content. The content within the range described above is preferred since this can maintain the strength of the coating film high while preventing the difficulty for the development of other performance of the material.

The colored light sensitive composition can be served for the image formation by photoirradiation. Formation of the colored images by using the colored light sensitive composition can be conducted basically by the following steps (1) to (3):

(1) A step of preparing the dispersed pigment composition and the preparing the colored light sensitive composition using the same.

(2) A step of transferring a layer formed by coating and drying then resultant colored light sensitive composition on a substrate or formed by coating and drying on a separate temporal support onto a substrate and then forming a layer by a colored light sensitive composition.

(3) A step of exposing and developing a layer by the colored light sensitive composition formed on the substrate thereby forming a pattern.

As the substrate, a transparent material such as a glass plate or a transparent plastic plate is used generally. For improving the adhesion between the substrate and the colored light sensitive composition, various kinds of commercially available silane coupling agents may be added to the colored light sensitive composition or the substrate may be previously subjected to a coupling treatment.

The coating liquid of the colored light sensitive composition can be coated to the substrate by using a known coating device such as a spin coater, roll coater, bar coater or curtain coater.

A method of transferring the layer with the colored light sensitive composition formed on the temporal support onto the substrate can include suitably a method of using a heat roll laminator under a normal pressure or a reduced pressure.

Examples of the developer used upon development can include, for example, hydroxides, carbonates or hydrogen carbonate of alkali metals or alkaline earth metals, aqueous ammonia and an aqueous solution of quaternary ammonium. They may be used alone or two or more kinds of them may be used in combination. Among them, an aqueous solution of sodium carbonate is particularly preferred.

Chromaticity of Red Pixel

The reflective color filter according to the present invention has two or more kind of patterned colored pixels different from each other in the hue on a substrate in which at least one of the colored pixels is the red pixel and the value x when the chromaticity of red pixel is measured by the xy specification system is 0.37 or more. The value x is preferably within a range from 0.37 to 0.40. When the value x is less than 0.37, while the transmittance is improved, the red color becomes pale and the color purity is lowered when used as a color filter.

"value x when the chromaticity is expressed by the xy specification system" is a value that can be obtained by determining the tristimulous values X, Y, Z according to CIE 1931 colorimetric system (XYZ specification system) and applying them to the following formulae:

$x=X/(X+Y+Z)$ $y=Y/(X+Y+Z)$

Specifically, the value x when the chromaticity is expressed by the xy specification system can be obtained by measuring using OSP-SP100 (manufactured by Olympus Co.) as a measuring device.

Reflective Color Filter

The reflective color filter according to the present invention has two or more kinds of patterned colored pixels different from each other in the hue on a substrate in which at least one of the colored pixels is the red pixel and the value x when the chromaticity of red pixel is measured by the xy specification system is 0.37 or more, and it is preferred to generally incorporate green pixels and blue pixels in addition to the red pixels described above.

The reflective color filter according to the invention preferably has value Y for the red pixel, which is a value representing the visual reflectance (value having correlation with lightness), among tristimulous values of X, Y and Z according to the CIE 1931 colorimetric system (XYZ color specification system) of 56 or more.

The reflective color filter according to the invention can be manufactured by repeating the steps of (2) and (3) in the method of forming colored images by using the colored light sensitive composition described above and combining patterns for a plurality of colors (usually tricolors of R, G and B).

The reflective color filter according to this invention can be manufactured also by utilizing the transfer method. The method of manufacturing the reflective color filter by utilizing the transfer method is described in details, for example, in JP-A Nos. 4-208940, 5-72724, 5-80503 and 5-173320 which can be utilized also to the reflective color filter according the invention.

The reflective color filter according to the invention includes, for example, an embodiment of forming the colored layer directly on a transparent substrate such as glass and an embodiment of forming the colored layer on a substrate on which active elements such as TFT are formed (embodiment of Color Filter-On-Array: COA).

The thickness of the layer comprising the colored light sensitive composition in the reflective color filter according to the invention (colored layer) is preferably 0.7 to 3.0 μm and, more preferably, 0.8 to 2 μm.

The reflective color filter according to the invention can be utilized generally for displays to be mounted on portable terminals such as portable telephones or game machines.

EXAMPLES

Examples of the present invention are to be described below but the invention is no way restricted to such examples.

Preparation of Dispersed Pigment Composition A

A red dispersed pigment composition A of the following composition was prepared.

| | |
|---|---|
| C.I. pigment red 209 | 6.4 g |
| Pigment dispersant 1 shown below | 0.06 g |
| Methacrylic acid/benzyl methacrylate copolymer (molar ratio 28/72, weight average molecular weight: 30000, 40% 1-methoxy-2-propyl acetate solution, acid value 105) | 15.8 g |
| 1-methoxy-2-propyl acetate | 57.2 g |

The pigment and the pigment dispersant 1 were applied with the following salt milling treatment (refining treatment) and then used for preparation.

500 g of sodium chloride, 5 g of hydrogenated rosin ester (Ester Gum HP, trade name of products manufactured by Arakawa Chemical Co.), 50 g of C.I. pigment red 209, 50 g of the following pigment dispersant 1 and 300 g of polyethylene glycol were kneaded in an open kneader (trade name: S1-1, manufactured by Moriyama Seisakusho) for 5 hours. The kneading product was charged in 2 liter of hot water, and stirred vigorously at about 70° C. by a disolver for 2 hours. Subsequently, the resultant dispersion was filtered and the residue on the filter was washed with water to remove sodium chloride and polyethylene glycol and then dried in an dry oven at about 40° C. for 2 days.

Pigment Dispersant 1

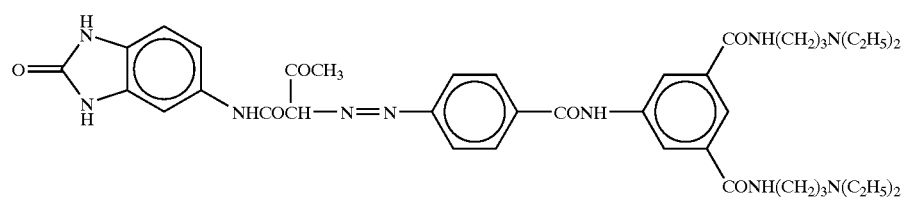

The red pigment composition of the composition described above was dispersed in a motor mill M-50 (manufactured by Eiger Co.) by using zirconia beads of 0.65 mm diameter at a circumferential speed of 9 m/s for 9 hours to prepare a red dispersed pigment composition A.

Preparation of Dispersed Pigment Composition B

A red dispersed pigment composition B was prepared in the same manner as for the preparation of the dispersed pigment composition A except for replacing the pigment dispersant 1 with the following pigment dispersant 2 in the preparation of the dispersed pigment composition A.

Pigment Dispersant 2

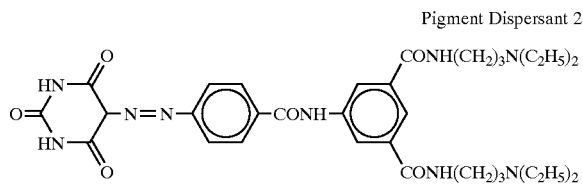

Preparation of Dispersed Pigment Composition C

A red dispersed pigment composition C for comparison was prepared in the same manner as for the preparation of the dispersed pigment composition A except for replacing C.I. pigment red 209 with C.I. pigment red 177 in the preparation of the dispersed pigment composition A.

For the obtained dispersed pigment compositions A–C, the following measurement and evaluation were conducted. The result of measurement is shown in Table 1.

Measurement for Viscosity

For the obtained dispersed pigment compositions A–C, the viscosity was measured by using an E type viscometer to evaluate the degree of increase for the viscosity.

Measurement for Contrast

The obtained dispersed pigment compositions A-C were coated each on a glass substrate to a thickness of 6 $\mu$m to prepare samples. Each sample was placed between two sheets of polarization plates, the amount of transmission light was measured with the axes of polarization being parallel and vertical to each other, and the ratio was defined as the contrast ("1990, Seventh Color Optics Conference, 512 Color Specification 10.4" Size TFT-LCD Color Filter, Ueki, Ozeki, Fukunaga, Yamahaka" was referred to).

TABLE 1

|  | Viscosity (mPa · s) | Contrast |
|---|---|---|
| Dispersed Pigment Composition A | 15.0 | 1800 |
| Dispersed Pigment Composition B | 17.5 | 1750 |
| Dispersed Pigment Composition C | 30.5 | 1500 |

From the result of Table 1 it was found that the dispersed pigment compositions A–B had low viscosity and excellent dispersion stability, and can provide high contrast.

When a dispersed pigment composition was prepared in the same manner as in the preparation of the dispersed pigment composition A except for using a copolymer having an acid value of 50 (at a molar ratio 14/86 as methacrylic acid/benzyl methacrylate copolymer) in the preparation of the dispersed pigment composition A, the viscosity was somewhat higher than the dispersed pigment composition A and the dispersibility was poor. In the same manner, when a dispersed pigment composition was prepared in the same manner as that for the preparation of the dispersed pigment composition A except for using a copolymer having an acid value of 145 (methacrylic acid/benzyl methacrylate copolymer at a molar ratio of 37/63) as methacrylic acid/benzyl methacrylate copolymer, the viscosity was somewhat higher than that of the dispersed pigment composition A and the dispersibility was poor.

Example 1

A colored light sensitive composition for the manufacture of the reflective color filter was prepared by mixing the following composition.

| Dispersed pigment composition A | 48.14 g |
|---|---|
| Methacrylic acid/benzyl methacrylate copolymer (molar ratio 28/72, weight average molecular weight: 30000, 30% 1-methoxy-2-propyl acetate solution) | 12.8 g |
| Pentaerythritol tetraacrylate | 4.58 g |
| 4-[p-N,N-di(ethoxycarbonylmethyl]-2,6-di(trichloromethyl)-5-triazine | 0.25 g |
| Hydroquinone monomethyl ether | 0.03 g |
| 1-methoxy-2-propyl acetate | 65.0 g |

A reflective color filter was manufactured as described below by using the obtained colored light sensitive composition for use in the manufacture of the reflective color filter That is, a colored light sensitive composition for use in the manufacture of the reflective color filter was coated on a glass substrate by using a spin coater and dried at 100° C. for 2 min to form a film habing thickness about 1.0 $\mu$m. Then, after exposing under a super-high pressure mercury lamp in a nitrogen gas stream, it was developed by using an aqueous 1% solution of sodium carbonate. For the obtained reflective color filter, the reflectance and chromaticity were measured by the following method. The result of measurement is shown in Table 2.

Measurement for Reflectance and Chromaticity

The reflectance and the chromaticity of the reflective color filter were measured by using OSP-SP100 (manufactured by Olympus Co.). The measured value Y is a value representing the visual reflectance (value having correlation with lightness), among tristimulous values of X, Y and Z according to the CIE1931 colorimetric system (XYZ color specification system). x and y are values calculated based on the tristimulous values X, Y and Z by using the formulae described above (value expressing the chromaticity coordinate).

Example 2

A reflective color filter was manufactured in the same manner as in Example 1 except for replacing the dispersed pigment composition A with the dispersed pigment composition B in Example 1, which was evaluated in the same manner as in Example 1.

Example 3

A colored light sensitive composition for use in the manufacture of a reflective color filter was prepared by mixing the following composition.

| C.I. pigment red 209 liquid dispersion (7147 M, manufactured by Mikuni Shikiso Co.) | 27.51 g |
|---|---|
| Methacrylic acid/benzyl methacrylate copolymer (molar ratio 28/72, weight average molecular weight: 30000, 30% 1-methoxy-2-propyl acetate solution) | 12.08 g |
| Pentaerythritol tetraacrylate | 4.58 g |
| 4-[p-N,N-di(ethoxycarbonylmethyl]-2,6-di(trichloromethyl)-5-triazine | 0.25 g |
| Hydroquinone monomethyl ether | 0.03 g |
| 1-methoxy-2-propyl acetate | 65.0 g |

A reflective color filter was manufactured in the same manner as in Example 1 by using the obtained colored light sensitive composition for use in the manufacture of a reflective color filter, and the reflectance and the chromaticity were measured in the same manner as in Example 1. The results are shown in Table 2.

Example 4

A colored light sensitive composition for use in manufacture of a reflective color filter was prepared by mixing the following composition.

| | |
|---|---|
| C.I. pigment red 209 liquid dispersant (7147 M, manufactured by Mikuni Shikiso Co.) | 25.07 g |
| Methacrylic acid / benzyl methacrylate copolymer (molar ratio 28/72, weight average molecular weight: 30000, 30% 1-methoxy-2-propyl acetate solution) | 12.56 g |
| Pentaerythritol tetraacrylate | 4.58 g |
| 4-[p-N,N-di(ethoxycarbonylmethyl]-2,6-di(trichloromethyl)-5-triazine | 0.25 g |
| Hydroquinone monomethyl ether | 0.03 g |
| 1-methoxy-2-propyl acetate | 65.0 g |

A reflective color filter was manufactured in the same manner as in Example 1 by using the obtained colored light sensitive composition for use in the manufacture of a reflective color filter, which was evaluated in the same manner as in Example 1. The results are shown in Table 2.

Comparative Example 1

A reflective color filter was manufactured in the same manner as in Example 1 except for replacing the dispersed pigment composition A with the dispersed pigment composition C in Example 1, which was evaluated in the same manner as in Example 1. The results are shown in Table 2.

TABLE 2

| | x | y | Y |
|---|---|---|---|
| Example 1 | 0.383 | 0.289 | 57.1 |
| Example 2 | 0.383 | 0.289 | 56.9 |
| Example 3 | 0.383 | 0.287 | 56.5 |
| Example 4 | 0.375 | 0.289 | 58.5 |
| Comparative Example 1 | 0.383 | 0.287 | 42.0 |

From the result of Table 2 it was confirmed that the reflective color filters of Examples 1 to 4 had large values Y representing the reflectance, high color purity of the reflection color filter and were excellent also in the light transmittance by the addition of the quinacridone series red pigment.

The present invention can provide a reflective color filter having high contrast, clear tone and high color purity and high transmittance compatible to each other while attaining low electric power consumption.

What is claimed is:

1. A reflective color filter comprising, on a substrate, two or more kinds of patterned colored pixels differing from each other in hue, wherein at least one of the colored pixels is red pixels comprising a dispersed pigment composition containing a quinacridone series red pigment, a dispersant having an azo pigment skeleton and a resin, and wherein a value x of an xy specification system is 0.37 or more when the red pixels are measured by a D65 light source, wherein the quinacridone series red pigment is C.I. pigment red 209.

2. A The reflective color filter according to claim 1, wherein the value x is from 0.37 to 0.40.

3. The reflective color filter according to claim 1, wherein the value Y in the CIE1931 colorimetric system of the red pixels is 56 or more.

4. The reflective color filter according to claim 1, wherein the red pixels comprise a colored light sensitive composition, which contains the dispersed pigment composition, a polyfunctional monomer having two or more ethylenically unsaturated double bonds, and a photopolymerization initiator.

5. The reflective color filter according to claim 4, wherein the polyfunctional monomer having two or more ethylenically unsaturated double bonds contains at least one member selected from the group consisting of acrylate ester, urethane acrylate, acrylic acid amide, methacrylate ester, urethane methacrylate, methacrylic acid amide, allyl compound and vinyl ester.

6. The reflective color filter according to claim 4, wherein the content of the polyfunctional monomer having two or more ethylenically unsaturated double bonds is 10 to 60 mass % of the total solid content of the colored light sensitive composition.

7. The reflective color filter according to claim 4, wherein the photopolymerization initiator contains at least one compound having a molecular absorption coefficient of at least 50 in a wavelength from 300 to 500 nm.

8. The reflective color filter according to claim 4, wherein the photopolymerization initiator contains at least one member selected from the group consisting of aromatic ketones, lophine dimers, benzoins, benzoin ethers and poly-halogens.

9. The reflective color filter according to claim 4, wherein the content of the photopolymerization initiator is 0.2 to 10 mass % of the total solid content of the colored light sensitive composition.

10. The reflective color filter according to claim 1, wherein the content of the quinacridone series red pigment is 5 to 20 mass % of the dispersed pigment composition.

11. The reflective color filter according to claim 1, wherein the resin is a polymer having acidic groups.

12. The reflective color filter according to claim 11, wherein the acid value of the polymer having the acidic groups is 60 to 130.

13. The reflective color filter according to claim 11, wherein the polymer having the acid groups contains at least one member selected from the group consisting of a copolymer of acrylic acid and acrylate ester, a copolymer of methacrylic acid and methacrylate ester, a styrene/maleic acid anhydride copolymer, and a reaction product of styrene/maleic acid anhydride copolymer and alcohol.

14. The reflective color filter according to claim 11, wherein the average molecular weight of the polymer having acidic groups is from 5,000 to 200,000.

15. The reflective color filter according to claim 1, wherein the dispersant is a compound represented by the following general formula (I):

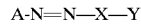  General Formula (I)

where A represents a group capable of forming an azo pigment, X represents a single bond or a group selected from the bivalent bonding groups represented by the following structural formula, Y represents a group represented by the following general formula (II)

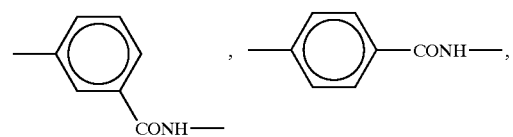

-continued

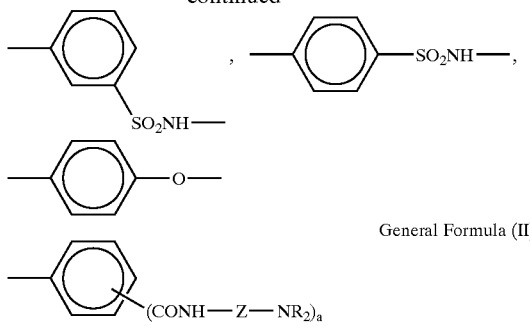

General Formula (II)

where Z represents a lower alkylene group, —NR$_2$ represents a 5-membered or 6-membered saturated hetero ring containing a lower alkyl amino group or a nitrogen atom, and a represents 1 or 2.

16. The reflective color filter according to claim 1, the reflective color filter being disposed on a substrate by (1) a step of forming a layer comprising a colored light sensitive composition on a substrate either by a step of coating and drying the colored light sensitive composition on the substrate or a step of transferring a layer formed by coating and drying the colored light sensitive composition on a temporal support, and (2) a step of exposing and developing the layer comprising the colored light sensitive composition thereby forming a pattern.

17. The reflective color filter according to claim 16, wherein the thickness of the layer comprising the colored light sensitive composition is 0.7 μm to 3.0 μm.

* * * * *